United States Patent
Bayart et al.

(10) Patent No.: US 6,813,428 B2
(45) Date of Patent: Nov. 2, 2004

(54) PHOTONIC CRYSTAL FIBER WITH A LARGE EFFECTIVE SURFACE AREA

(75) Inventors: Dominique Bayart, Clamart (FR); Laurent Berthelot, Orsay (FR)

(73) Assignee: Alcatel, Paris (FR)

(*) Notice: Subject to any disclaimer, the term of this patent is extended or adjusted under 35 U.S.C. 154(b) by 43 days.

(21) Appl. No.: 10/098,127

(22) Filed: Mar. 15, 2002

(65) Prior Publication Data

US 2002/0131741 A1 Sep. 19, 2002

(30) Foreign Application Priority Data

Mar. 16, 2001 (FR) .............................. 01 03639

(51) Int. Cl.⁷ ................................................ G02B 6/20
(52) U.S. Cl. ...................... 385/125; 385/123; 385/126
(58) Field of Search ................................. 385/125, 123, 385/126

(56) References Cited

U.S. PATENT DOCUMENTS

| | | |
|---|---|---|
| 5,155,792 A | 10/1992 | Vali et al. |
| 5,471,553 A | 11/1995 | Teshima |
| 5,570,448 A | 10/1996 | Imoto et al. |
| 5,799,125 A | 8/1998 | Inagaki et al. |
| 5,802,236 A | 9/1998 | DiGiovanni et al. |
| 6,097,870 A | 8/2000 | Ranka et al. |
| 6,334,019 B1 | 12/2001 | Birks et al. |
| 6,418,258 B1 | 7/2002 | Wang |
| 6,571,045 B2 | 5/2003 | Hasegawa et al. |
| 6,614,974 B2 | 9/2003 | Elrefaie et al. |
| 2001/0024557 A1 * | 9/2001 | Hasegawa et al. .......... 385/125 |
| 2002/0061176 A1 * | 5/2002 | Libori et al. ................ 385/125 |
| 2002/0118938 A1 * | 8/2002 | Hasegawa et al. .......... 385/125 |

FOREIGN PATENT DOCUMENTS

| | | |
|---|---|---|
| EP | 1118887 A2 | 7/2001 |
| WO | WO 99/64903 | 12/1999 |
| WO | WO 00/67350 | 11/2000 |

OTHER PUBLICATIONS

J. C. Knight et al, "Large Mode Area Photonic Crystal Fibre", Electornics Letters, IEE Stevenage, GB, vol. 34, No. 13, Jun. 25, 1998, pp. 1347–1348, XP000846344.

* cited by examiner

Primary Examiner—Ellen E. Kim
Assistant Examiner—Sung Pak
(74) Attorney, Agent, or Firm—Sughrue Mion, PLLC

(57) ABSTRACT

An optical fiber with a large effective surface area has holes at points in at least two layers concentric with the fiber of points of a regular matrix. The holes in one layer have the same dimensions and occupy all the available points in the layer. In at least two layers the holes have different dimensions.

10 Claims, 2 Drawing Sheets

FIG_1
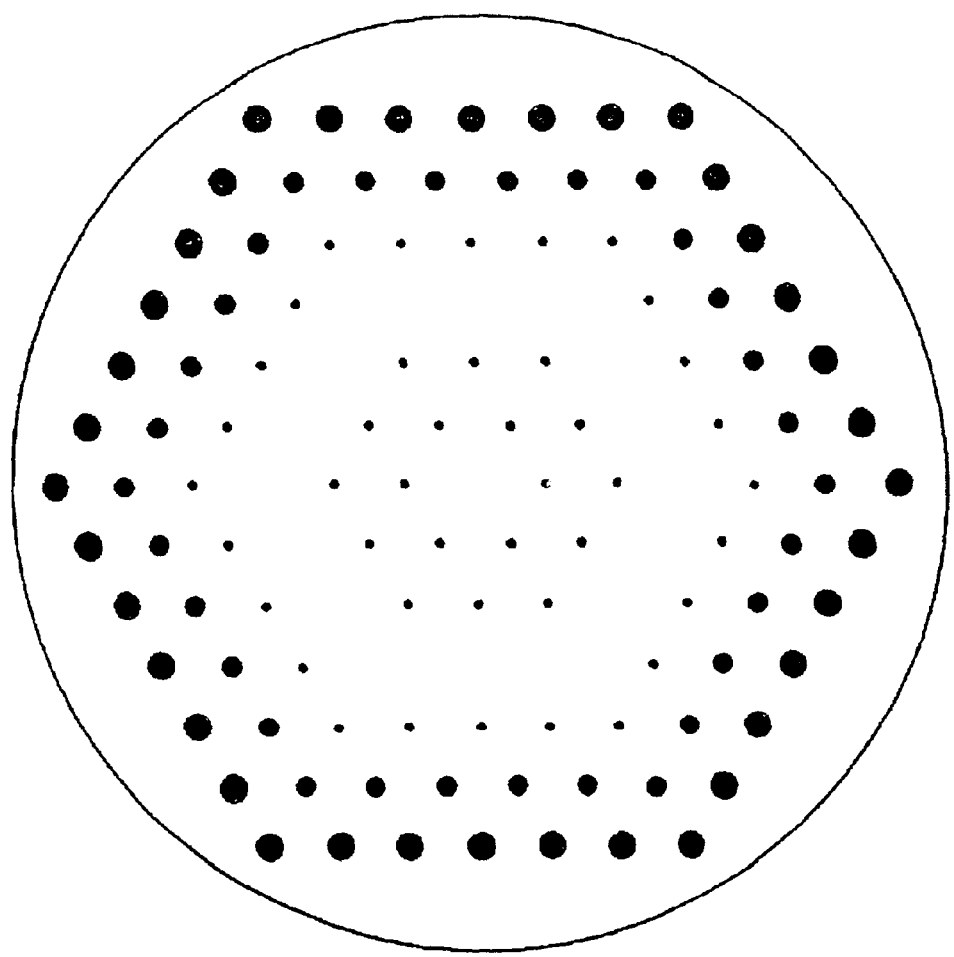
FIG_3
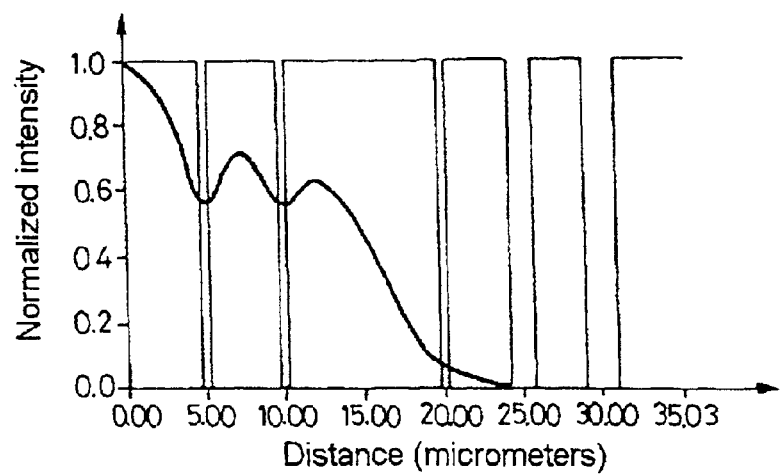

PHOTONIC CRYSTAL FIBER WITH A LARGE EFFECTIVE SURFACE AREA

CROSS-REFERENCE TO RELATED APPLICATIONS

This application is based on French Patent Application No. 01 03 639 filed Mar. 16, 2001, the disclosure of which is hereby incorporated by reference thereto in its entirety, and the priority of which is hereby claimed under 35 U.S.C. §119.

BACKGROUND OF THE INVENTION

1. Field of the Invention

The Present invention concerns transmission via optical fibers, to be more specific transmission via photonic crystal fibers.

2. Description of the Prior Art

The index profile of an optical fiber is generally qualified as a function of the shape of the graph of the function that associates the radius of the fiber and the refractive index. It is conventional to plot the distance r from the center of the fiber on the horizontal axis and the difference between the refractive index of the cladding and the refractive index of the fiber on the vertical axis. Thus the expressions "step index profile", "trapezium index profile" and "triangle index profile" are used with reference to graphs that are respectively step-shaped, trapezium-shaped and triangular. The curves are generally representative of a theoretical or set point profile of the fiber. Fiber fabrication constraints can yield a significantly different profile. Variations in the index in accordance with the profile control the propagation of light along the fiber.

Photonic crystal fibers have recently been introduced. Unlike conventional fibers, photonic crystal fibers do not consist entirely of a solid transparent material such as doped silica; seen in section, a photonic fiber has a plurality of holes filled with air. The holes are parallel to the axis of the fiber and extend longitudinally along the fiber. In practice, the holes can be obtained by fabricating the preform by assembling silica capillary tubes and cylinders in accordance with the pattern of the holes to be obtained in the fiber. Drawing this kind of preform produces a fiber with holes corresponding to the capillary tubes.

The holes in the material of the fiber create variations in the mean index of the material; as in a conventional optical fiber, these variations in the index can be used to guide optical signals at appropriate wavelengths. Photonic crystal fibers are described in WO-A-00 49 435: in addition to describing the theory of operation of photonic crystal fibers, the above document describes a method of assembling them. In cross section, the patterns of holes proposed in the above document are based on a matrix of triangular holes, i.e. the potential locations of holes form lines in three directions inclined at 60° to each other. The omission of some holes in the matrix guides light; to be more specific, in one embodiment, the hole at the center of the fiber is omitted so that, in cross section, the fiber consists of a solid core surrounded by holes formed in accordance with the triangular matrix. In a second embodiment there are seven holes at the center of the fiber, at the vertices and the center of a regular hexagon. Holes are disposed around the central hexagon at the vertices of hexagons forming a mosaic across the cross section of the fiber; there is no hole at the center of the hexagons other than the central hexagon. The above document further proposes to use holes of different diameter, destroying the symmetry of the fiber on rotation through 60° about its center; the object of this is to modify the birefringence of the fiber.

R. F. Cregan et al., "Distribution of Spontaneous Emission from an $Er^3$-Doped Photonic Crystal Fiber", Journal of Lightwave Technology, vol. 17, No. 11, November 1999 discusses spontaneous emission in a photonic crystal fiber. The holes filled with air are distributed in a triangular matrix and the fiber is hexagonal; there is no hole in the fiber at the center of the hexagon, and the silica is doped with erbium. The above document discusses the spatial distribution of the spontaneous emission when the fiber is pumped axially, and shows that this distribution is a function of the distribution of the holes in the fiber, which agrees with simulation results. No mention is made of any use of the doped fiber.

Thomas Sondergaard, "Photonic Crystal Distributed Feedback Fiber Lasers with Bragg Gratings", Journal of Lightwave Technology, vol. 18, No. 4, April 2000 discusses the use of photonic crystal fibers to produce fiber lasers; the above document specifies that the mode surfaces for the signal or for the pump can be smaller or larger than the corresponding mode surfaces of conventional stepped index fibers. Photonic crystal fibers can therefore be used to produce fiber lasers with a low pumping threshold—in the case of weak mode surfaces—or high-power lasers—in the case of strong mode surfaces. The above document refers only to digital simulation results, and ignores any practical implementation.

W J. Wadsworth et al., "$Yb^{3+}$-doped photonic crystal fibre laser", Electronics Letters, vol. 36, No. 17, August 2000 describes the experimental achievement of a laser effect in a photonic crystal fiber; the fiber is made by surrounding pure silica capillary tubes with a silica tube doped with Yb and codoped with Al; this combination is then drawn to form a fiber, around which a pure silica sleeve is placed. Two rows of holes surround the core and light is strongly confined within the doped core of the fiber.

EP-A-1 043 816 describes a double-cladding fiber; the signal is transmitted in the doped core of the fiber and a pump is injected into the first cladding. To direct the light from the pump to the doped core, it is proposed to provide modified index regions in the first cladding. The modified index regions can in particular be holes filled with air. One embodiment includes three modified index regions distributed over the periphery of the first cladding. Another embodiment includes six modified index regions, forming the vertices and the mid-points of the sides of an equilateral triangle. It is suggested that the modified index regions must be placed as far as possible from the core of the fiber to avoid modifying the polarization in the core of the fiber.

The problem addressed by the invention is that of distributing the holes in a photonic crystal fiber to improve the effect of confinement of light in the fiber. The invention proposes a double-cladding fiber in which holes are provided to improve the overlap between the signal and the pump.

SUMMARY OF THE INVENTION

To be more precise, the invention proposes a photonic crystal fiber having a plurality of holes distributed over points of a regular matrix and wherein:

the holes are on at least two layers of points of the matrix concentric with the fiber, the holes in a layer have the same dimensions and occupy all points of the layer, and the holes in at least one layer have dimensions greater than or equal to the dimensions of the holes in another layer inside it.

In a preferred embodiment the matrix is a triangular matrix and the layers are hexagonal.

The fiber preferably has an effective surface area greater than or equal to 150 µm². The invention further provides a transmission system including the above fiber as line fiber, an optical amplifier including a section of the above fiber doped with at least one rare earth ion, and a fiber laser including a section of the above fiber.

Other features and advantages of the invention will become apparent on reading the following description of embodiments of the invention, which description is given by way of example and with reference to the accompanying drawings.

BRIEF DESCRIPTION OF THE DRAWINGS

FIG. 1 is a diagram showing the cross section of one embodiment of a photonic crystal fiber in accordance with the invention.

FIG. 3 shows the intensity of the signal in the fiber shown in FIG. 1 as a function of radius.

DETAILED DESCRIPTION OF THE PREFERRED EMBODIMENT

Figure 2:
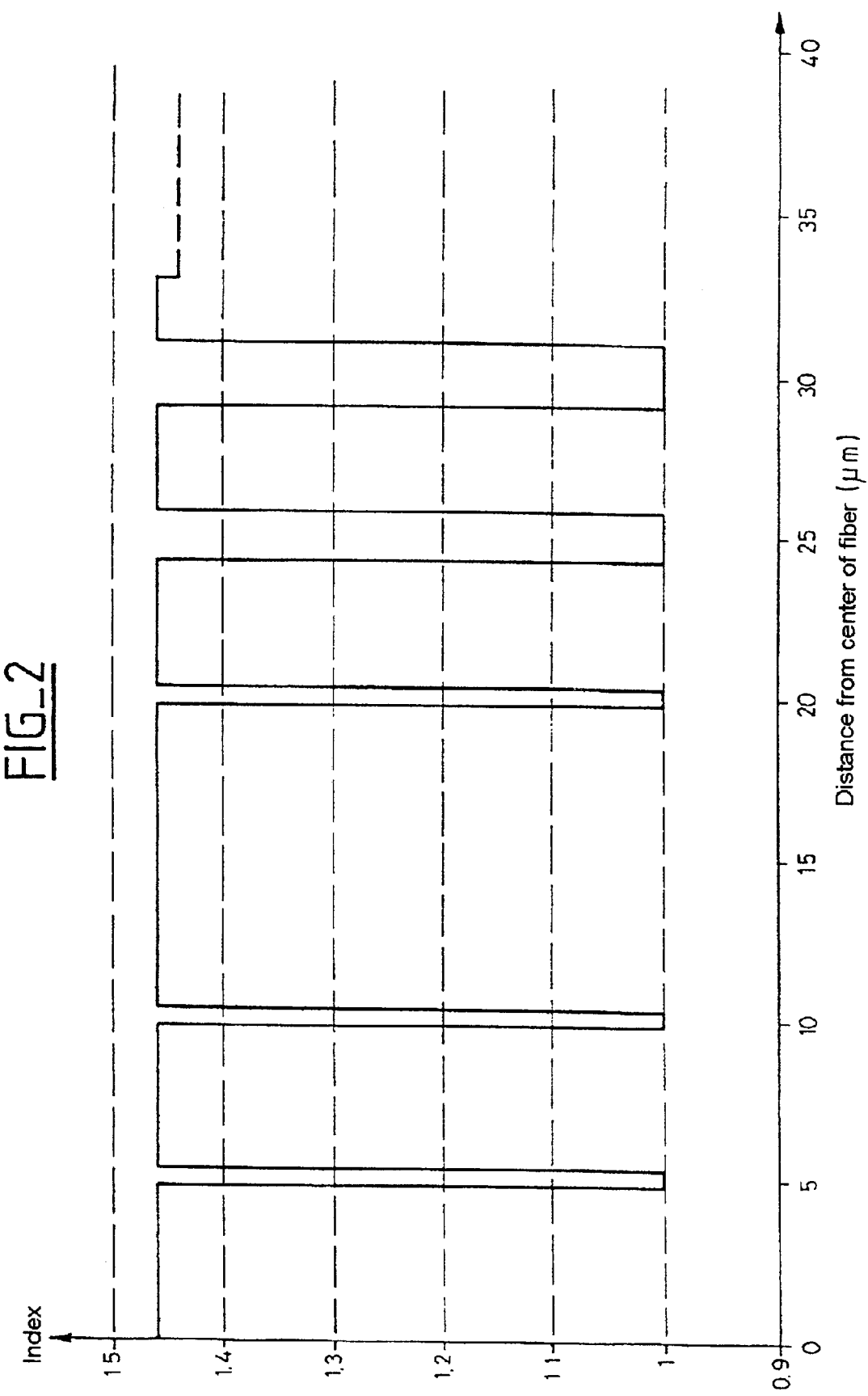
FIG. 2 shows the set point index profile of the fiber shown in FIG. 1.

The invention proposes a distribution of the holes in the matrix of holes in a photonic crystal fiber in a pattern that preserves the symmetry of the fiber about its longitudinal axis as much as possible. On the other hand, it proposes that the distribution be irregular in a radial direction: for example, it is possible to eliminate some of the holes, or to reduce the diameter thereof.

In the remainder of the description, the term "matrix" refers to the set of all potential locations of holes in the photonic crystal fiber; because the fiber preform is formed by assembling capillary tubes and solid cylinders, this "matrix" is defined by the disposition of the tubes and the cylinders in the preform. In the examples of the prior art referred to above, the matrix is triangular: the tubes and cylinders are disposed in rows, two adjacent rows being offset by a distance corresponding to the distance between two adjacent tubes or cylinders in the row. Other matrix shapes are possible—for example a square matrix. In all cases, the matrix is formed by a set of points at which there may be a hole.

The term "layer" refers to a subset of the matrix of points which, in cross section, conforms as closely to possible to rotational symmetry about the center of the fiber. Successive layers are concentric, with the center of the fiber as their common center. In the example of a triangular matrix, the layer is typically formed of a set of holes disposed at the vertices and where applicable on the sides of a hexagon; the first layer has six points disposed at the vertices of a hexagon whose center is the center of the fiber; in the example shown in the figure, there are holes at all of the points in this layer. The second layer is formed of twelve points, disposed at the vertices and at the mid-points of the sides of a regular hexagon; the length of a side of the hexagon is equal to twice the length of the side of the hexagon forming the first layer; in the FIG. 1 example, holes are also provided at all points in this layer. The third layer is formed of twenty four points at the vertices of a hexagon and at points one-third and two-thirds along each side; there are no holes in the third layer in the FIG. 1 example. The subsequent layers can be defined in the same fashion. In this example, each layer is invariant on rotation through 60° about the center of the fiber; each layer therefore constitutes an approximation of a circle, using the available points of the matrix. This definition of a "layer" is generalized to other types of matrix. Accordingly, for a square matrix, a layer could be formed of a set of points disposed at the vertices of a square or an octagon; a layer would then be invariant on rotation through 90° about the center of the fiber. The document by W. J. Wadsworth et al. cited above discloses two "periods" of holes around the center of the fiber; each "period" is circular.

FIG. 1 is a diagrammatic representation of the cross section of one embodiment of a photonic crystal fiber according to the invention; in the FIG. 1 example, the matrix is triangular, with a distance of 5 µm between the points of the matrix; each layer forms a regular hexagon, as explained above. There is no hole at the center of the fiber; the first, second and fourth layers have holes with a diameter of 0.5 µm. There are no holes in the third layer; the fifth layer has holes with a diameter of 1.5 µm and the sixth layer has holes with a diameter of 2.0 µm. Along a radius passing through the vertices of the hexagons forming the various layers, there are therefore encountered, starting from the center:

0.5 µm diameter holes at distances of 5 µm, 10 µm and 20 µm, a 1.5 µm diameter hole at a distance of 25 µm, and a 2.0 µm diameter hole at a distance of 30 µm.

The layers of the fiber shown in the figure are concentric; when a layer includes holes, the holes occupy all of the points of the layer: in this example, the first layer includes six holes, i.e. all available holes of the first layer.

FIG. 2 shows an index profile of the fiber along a radius of the fiber passing through a vertex of the hexagon formed by the holes. The index is plotted on the vertical axis and the distance from the center of the fiber on the horizontal axis. In the example shown in the figure, in the absence of the holes, the fiber would be a simple stepped index fiber: the material of the fiber therefore has a constant index having a first value close to 1.46 for radii less than 33 µm and an index having a value around 1.44 beyond that radius, i.e. in the cladding. In the absence of holes, a profile of this kind would mean that the fiber was not a monomode fiber. Because of the holes, the fiber of this example is a monomode fiber at all wavelengths.

FIG. 3 shows the intensity of the signal as a function of the radius of the FIG. 1 fiber. The normalized intensity of the signal injected into the fiber is plotted on the vertical axis and the distance in µm from the center of the fiber is plotted on the horizontal axis. The thin line shows the index profile of the fiber. The figure shows that the effect of the holes is to impose "barriers" to the field. To be more specific, the field tends to spread into the portions in the fiber in which the ratio between the surface area of the holes and the surface area of the silica (hole filling factor) is lowest; thus FIG. 3 shows a drop in intensity in the vicinity of the 5 µm and 10 µm holes; on the other hand, the absence of holes in the third row produces a local maximum intensity in the vicinity of a 12 µm radius. The holes of the fourth, fifth and sixth rows have the same effect, which is masked in the figure by the low relative value of the intensity.

The FIG. 1 fiber has an effective surface area of 991 µm². It has a chromatic dispersion of 21.2 ps/nm/km and a slope of 0.071 ps/nm²/km.

More generally, the fiber can be defined as follows:

the holes are on at least two layers of points of the matrix concentric with the fiber, the holes in a layer have the same dimensions and occupy all points of the layer, and the holes in at least one layer have dimensions greater than or equal to the dimensions of the holes in another layer inside it.

In other words, the holes of the fiber have a radial symmetry as far as possible, given the geometrical constraints imposed by the matrix of points. Nevertheless, the dimensions of the holes vary along a radius of the fiber.

As in the FIG. 1 example, the fiber can have at least one layer with no holes; this layer allows the field to spread into the fiber and thereby increase the effective surface area.

According to the invention, the dimensions of the holes increase in the radial direction: in other words, the holes of one layer are larger than the holes of another layer inside it; this is the case in the FIG. 1 fiber, because the holes of the fifth row are larger than the holes of the first, second and fourth rows; also, the holes of the sixth row are larger than the holes of the first, second, fourth and fifth rows. This radial increase in the dimensions of the holes improves the confinement of light within the fiber; this is because, from the qualitative point of view, larger holes correspond to a greater reduction of the mean index, and a layer of holes can be considered to form a kind of index step, with an index variation proportional to the variation in the dimensions of the holes.

The above features produce a fiber with an effective surface area greater than or equal to 150 $\mu m^2$. The fiber is a monomode fiber at all wavelengths.

These features can be used with or without doping of the silica. The doping can vary the index, and doping with rare earths provides amplification.

The fiber can be used as a line fiber in a fiber optic transmission system, or as a component in a fiber laser or a fiber amplifier, especially if it has appropriate doping. In the case of an amplifier, this means doping with at least one rare earth ion having an atomic number between 57 and 71. Materials that can be used include erbium, ytterbium, germanium and other elements that are widely used in optical amplifiers. The high effective surface area of the fiber is particularly advantageous in such applications.

What is claimed is:

1. A photonic crystal fiber having a plurality of holes distributed over points of a regular matrix and wherein:

said holes are on a plurality of layers of points of said matrix concentric with said fiber, and said holes in each respective layer have the same dimensions and occupy all points of said respective layer, wherein another layer, corresponding to points of said matrix, has no holes and is positioned between at least two of said layers such that at least two layers are positioned outward from said layer with no holes, and wherein dimensions of the holes in said at least two layers positioned outward from said layer with no holes increase, respectively, as a distance from said layer with no holes to the at least two layers increases.

2. The fiber claimed in claim 1 wherein said matrix is a triangular matrix and said layers are hexagonal.

3. The fiber claimed in claim 1 having an effective surface area greater than or equal to 150 $\mu m^2$.

4. A transmission system including, as line fiber, a photonic crystal fiber having a plurality of holes distributed over points of a regular matrix and wherein:

said holes are on a plurality of layers of points of said matrix concentric with said fiber, and said holes in each respective layer have the same dimensions and occupy all points of said respective layer, wherein another layer, corresponding to points of said matrix, has no holes and is positioned between at least two of said layers such that at least two layers are positioned outward from said layer with no holes, and wherein dimensions of the holes in said at least two layers positioned outward from said layer with no holes increase, respectively, as a distance from said layer with no holes to the at least two layers increases.

5. An optical amplifier including a section of photonic crystal fiber having a plurality of holes distributed over points of a regular matrix and wherein:

said holes are on a plurality of layers of points of said matrix concentric with said fiber, and said holes in each respective layer have the same dimensions and occupy all points of said respective layer, and wherein another layer, corresponding to points of said matrix, has no holes and is positioned between at least two of said layers such that at least two layers are positioned outward from said layer with no holes, and wherein dimensions of the holes in said at least two layers positioned outward from said layer with no holes increase, respectively, as a distance from said layer with no holes to the at least two layers increases.

6. A fiber laser including a section of photonic crystal fiber having a plurality of holes distributed over points of a regular matrix and wherein:

said holes are on a plurality of layers of points of said matrix concentric with said fiber, and said holes in each respective layer have the same dimensions and occupy all points of said respective layer, wherein another layer, corresponding to points of said matrix, has no holes and is positioned between at least two of said layers such that at least two layers are positioned outward from said layer with no holes, and wherein dimensions of the holes in said at least two layers positioned outward from said layer with no holes increase, respectively, as a distance from said layer with no holes to the at least two layers increases.

7. The fiber claimed in claim 1, wherein the dimensions of the holes in each of said layers positioned outward from said layer with no holes increases from layer to layer as said distance increases.

8. The transmission system according to claim 4, wherein the dimensions of the holes in each of said layers positioned outward from said layer with no holes increases from layer to layer as said distance increases.

9. The optical amplifier of claim 5, wherein the dimensions of the holes in each of said layers positioned outward from said layer with no holes increases from layer to layer as said distance increases.

10. The fiber laser of claim 6, wherein the dimensions of the holes in each of said layers positioned outward from said layer with no holes increases from layer to layer as said distance increases.

* * * * *